(12) United States Patent
Johnson

(10) Patent No.: US 6,397,980 B1
(45) Date of Patent: Jun. 4, 2002

(54) SEALED DRY DISC BRAKE

(75) Inventor: Michael E. Johnson, Rochester, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/375,641

(22) Filed: Aug. 17, 1999

(51) Int. Cl.⁷ .............................................. F16D 55/04
(52) U.S. Cl. ..................................... 188/71.3; 188/18 A
(58) Field of Search ............................. 188/72.4, 71.3, 188/71.4, 71.5, 71.6, 73.46, 72.5, 264 A, 264 AA, 18 A, 106 A, 106 P, 366, 367, 368, 369

(56) References Cited

U.S. PATENT DOCUMENTS

| | | | | |
|---|---|---|---|---|
| 2,268,329 A | * | 12/1941 | Ash | 188/18 A |
| 2,323,052 A | * | 6/1943 | Klaue | 188/71.4 |
| 2,329,097 A | * | 9/1943 | Ash | 188/18 A |
| 3,633,714 A | * | 1/1972 | Klaue | 188/71.4 |
| 3,942,610 A | * | 3/1976 | Klaue | 188/71.4 |
| 3,980,347 A | * | 9/1976 | Griesenbrock | 188/71.4 X |
| 4,024,931 A | * | 5/1977 | Klaue | 188/18 A |
| 4,054,189 A | * | 10/1977 | Klaue | 188/71.4 |
| 4,139,081 A | * | 2/1979 | Klaue | 188/18 A |
| 4,325,466 A | * | 4/1982 | Klaue | 188/71.4 |

FOREIGN PATENT DOCUMENTS

DE 1134902 * 8/1962 ............... 188/71.4

* cited by examiner

Primary Examiner—Pam Rodriguez
(74) Attorney, Agent, or Firm—Carlson, Gaskey & Olds

(57) ABSTRACT

An improved dry disc brake has its housing positioned radially inwardly of its rotating member. In this way, the interface between the pads and the rotor is sealed from the environment. Further, there are two braking surfaces on the rotating member at opposed ends of the housing. Since the braking heat is spread across two surfaces, the system is better able to take heat away from the braking operation. The use of external facing fins adds even more capacity to take heat away.

6 Claims, 1 Drawing Sheet

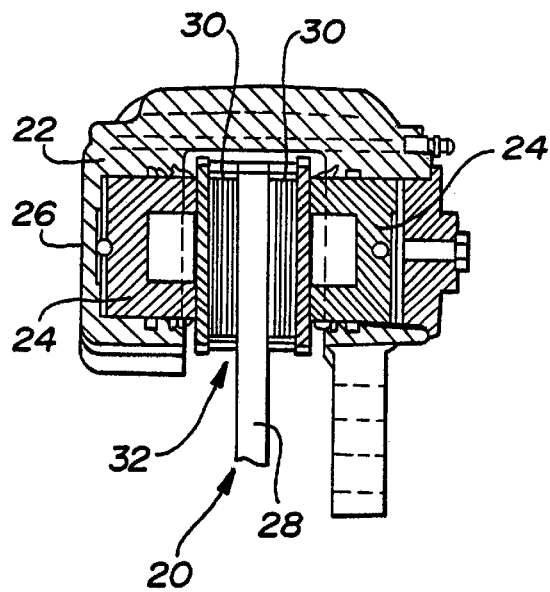
_Fig-1_
_Prior Art_
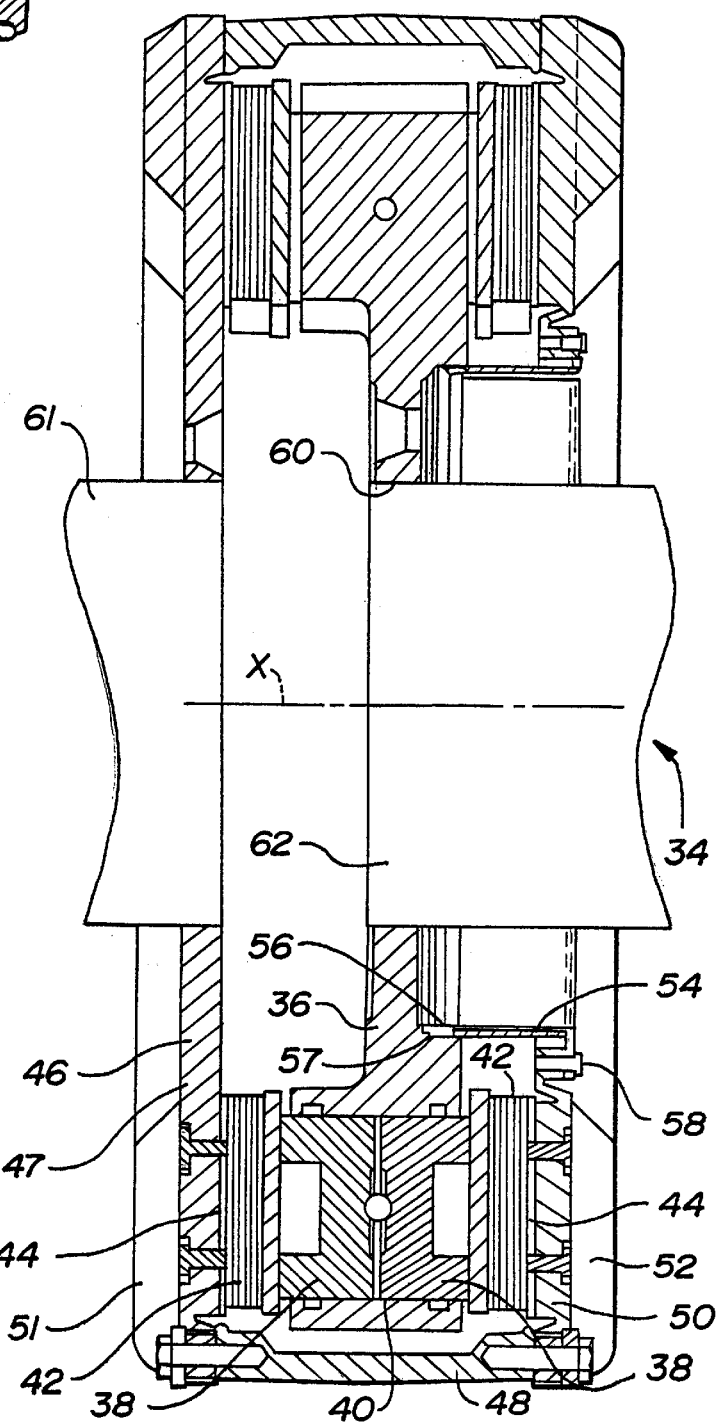
_Fig-2_

SEALED DRY DISC BRAKE

BACKGROUND OF THE INVENTION

This invention relates a dry disc brake wherein the interface between the friction pads and the rotating member is sealed from the environment.

Disc brakes are utilized in a variety of braking applications. In particular, disc brakes are utilized in heavy vehicle braking. One known type of disc brake is a "dry" disc brake. In a second type known as a "wet" disc brake, the brake discs are secured in a sealed chamber carrying a fluid. In a dry disc brake, hydraulic pistons are actuated to engage friction pads with a rotating surface. The engagement of the friction pads and the rotating surface slows rotation of the rotating surface.

A dry disc brake 20 as known in the prior art is shown in FIG. 1. A fixed housing 22 carries a pair of opposed pistons 24. Pistons 24 are supplied with fluid through fluid communication lines 26. The fluid communication lines receive a hydraulic fluid to move the pistons 24 and pads 30 towards a rotating disc 28. A pad 30 is actuated on each side of the disc 28. When the system attempts to brake rotation of the rotating member 28, hydraulic fluid is supplied to the pistons 24 which are forced inwardly, forcing the pads 30 against the rotating member 28. This slows rotation of the rotating member 28. In the embodiment shown in FIG. 1, an open area 32 is defined inwardly of the rotating member 28 and the pad 30.

This open area allows debris to reach the interface between the pads 30 and the rotating member 28. This can affect the braking characteristics of the system. Further, the open area 32 might present sparking issues in certain applications. Finally, the braking force occurs over a limited area on the two sides of the rotating member 28. The heat created by the braking is entirely on the one small rotating member 28 in this prior art system.

SUMMARY OF THE INVENTION

In a disclosed embodiment of this invention, the fixed components of a dry disc brake are positioned internally of the rotating components. The rotating components surround the pistons and pads, and seal the interface between the pads and the rotating member from debris, etc. Further, the interface is provided on two discs of the rotating member such that the surface area which carries the braking load is on two separate housing components. Thus, there is twice as much housing surface area for carrying heat away from the braking operation when compared to the prior art. These and other features of the present invention can be best understood from the following specification and drawings, the following of which is a brief description.

BRIEF DESCRIPTION OF THE DRAWINGS

FIG. 1 shows a prior art dry disc brake.

FIG. 2 shows the inventive dry disc brake.

DETAILED DESCRIPTION OF A PREFERRED EMBODIMENT

A dry disc brake 34 is illustrated in FIG. 2. A fixed housing 36 is provided with a pair of opposed pistons 38. A hydraulic fluid supply 40 supplies fluid to the chambers between the pistons 38. It should be understood, that pistons 38 are not rings, but rather are circular and spaced circumferentially about a central axis X of the housing 36.

Pads 42 are positioned on each side of the pistons 38. Friction plates 44 are positioned on a rotating member 46 and associated with each of the pads 42. As with the prior art, when it is desired to slow or stop rotation of the rotating member 46, pistons 38 are forced by hydraulic fluid to engage the pads 42 with the friction plates 44. Plates 44 are wear plates, and are optional. However, with this invention, the friction plates are not on opposed faces of a single plate, but instead are on two different housing portions. Thus, the heat from the braking operation is split over two housing components, and is more easily removed by convection.

As shown, the rotating member 46 includes a first wall member 47 associated with one friction plate 44, a cylindrical outer wall 48 extends between and connected to a second wall member 50. External fins 51 and 52 are formed on each of the wall members 48 and 50 and assist in carrying heat away from the walls 47 and 50 when braking occurs.

A seal 54 has an inner seal portion 56 in contact with a shoulder 57 on the housing 36. The seal 54 rotates with the rotating member 46, and insures that debris, etc. will not leak into the area of the discs.

A connector 58 secures the seal 54 to the portion 50.

An axle 60 supports the housing 36. A shaft 61 rotates with the plate 46, and may be associated with a wheel.

The present invention thus discloses a dry disc brake wherein the components which perform the braking operation are enclosed and protected from debris. Further, the present invention discloses a system wherein the braking heat is placed on two separate housing members, and thus causes less concern than with the prior art single braking disc.

A worker of ordinary skill in this art would recognize that certain modifications come within the scope of this invention. For that reason the following claims should be studied to determine the true scope and content of this invention.

What is claimed is:

1. A dry disc brake comprising:

a central housing carrying a pair of opposed pistons, said central housing including communication lines for supplying an actuating fluid to said pistons, a pair of disc plates positioned outwardly of said pistons and on opposed sides of said pistons; and a rotating member rotating with a shaft, said rotating member having first and second rotating plates positioned on each side of said housing, and said pistons being actuatable to selectively bring said disc plates into contact with said first and second rotating plates to slow rotation of said rotating member, said rotating member including said first plate being positioned on one side of said pistons, an outer housing extending along a length of said pistons radially outwardly of said pistons relative to a rotational axis of said rotating member, and said outer housing being fixed to said first plate, and said second plate being secured to said outer housing on an opposed side of said pistons from said first plate to seal an interface between said pistons and disc plates and said first and second rotating plates, a seal rotating with one of said plates, and being in sealing contact with a portion of said central housing, to seal a space between said pistons and said rotating plates from the environment.

2. A brake as according to claim 1, wherein both of said rotating plates have external fins for assisting in taking heat away from an interface of said disc plates and said rotating plates.

3. A dry disc brake as recited in claim 1, wherein said seal has an inner seal portion in contact with an inner-peripheral surface of a shoulder on said housing, said shoulder on said housing surrounding a rotational axis of said rotating shaft.

4. A dry disc brake as recited in claim 3, wherein said housing is mounted on an axle shaft, said axle shaft is generally coaxial with said rotating shaft.

5. A dry disc brake as recited in claim 4, wherein there is a space between opposed ends of said rotating shaft and said axle shaft.

6. A dry disc brake as recited in claim 1, wherein a first of said rotating plates is fixed to said rotating shaft, and said seal being fixed to a second of said rotating plates.

* * * * *